(12) United States Patent
Paolucci

(10) Patent No.: US 7,732,715 B2
(45) Date of Patent: Jun. 8, 2010

(54) WALL FLUSH MOUNT SUPPORTING DEVICE FOR ELECTRIC OR ELECTRONIC COMPONENTS

(75) Inventor: Marco Paolucci, Jesi (IT)

(73) Assignee: Eclettis S.R.L., Jesi (AN) (IT)

( * ) Notice: Subject to any disclaimer, the term of this patent is extended or adjusted under 35 U.S.C. 154(b) by 972 days.

(21) Appl. No.: 10/589,047

(22) PCT Filed: Feb. 15, 2005

(86) PCT No.: PCT/IT2005/000079

§ 371 (c)(1),
(2), (4) Date: Aug. 10, 2006

(87) PCT Pub. No.: WO2005/083861

PCT Pub. Date: Sep. 9, 2005

(65) Prior Publication Data

US 2008/0283292 A1    Nov. 20, 2008

(30) Foreign Application Priority Data

Feb. 26, 2004   (IT)   ................... MC2004A0028

(51) Int. Cl.
*H02G 3/08*   (2006.01)

(52) U.S. Cl. .............. 174/481; 174/502; 174/53; 174/58; 220/3.2; 220/3.3; 248/906

(58) Field of Classification Search ............... 174/480, 174/481, 50, 53, 57, 58, 66, 67; 220/3.2–3.9, 220/4.02, 3.94; 248/906; 439/535, 536, 439/949

See application file for complete search history.

(56) References Cited

U.S. PATENT DOCUMENTS

| | | | | |
|---|---|---|---|---|
| 4,988,832 A | * | 1/1991 | Shotey | 174/67 |
| 6,737,576 B1 | * | 5/2004 | Dinh | 174/50 |
| 7,044,318 B2 | * | 5/2006 | Gates, II | 220/3.94 |
| 7,078,618 B2 | * | 7/2006 | Dinh | 174/481 |
| 7,476,806 B2 | * | 1/2009 | Dinh | 174/58 |
| 7,525,043 B1 | * | 4/2009 | Gretz | 174/50 |
| 7,557,308 B2 | * | 7/2009 | Dinh | 174/481 |
| 7,569,770 B2 | * | 8/2009 | Remmert et al. | 174/50 |

* cited by examiner

*Primary Examiner*—Angel R Estrada
(74) *Attorney, Agent, or Firm*—Hodes, Pessin & Katz, P.A.

(57) ABSTRACT

A wall flush mount supporting device for electric or electronic components. A wall recessed box with a collar has an external cover or finishing plate in perfectly co-planar position with the wall in which the supporting device is recessed. The external surface of the component and the external surface of the finishing plate do not protrude from the frontal edges of the collar.

13 Claims, 5 Drawing Sheets

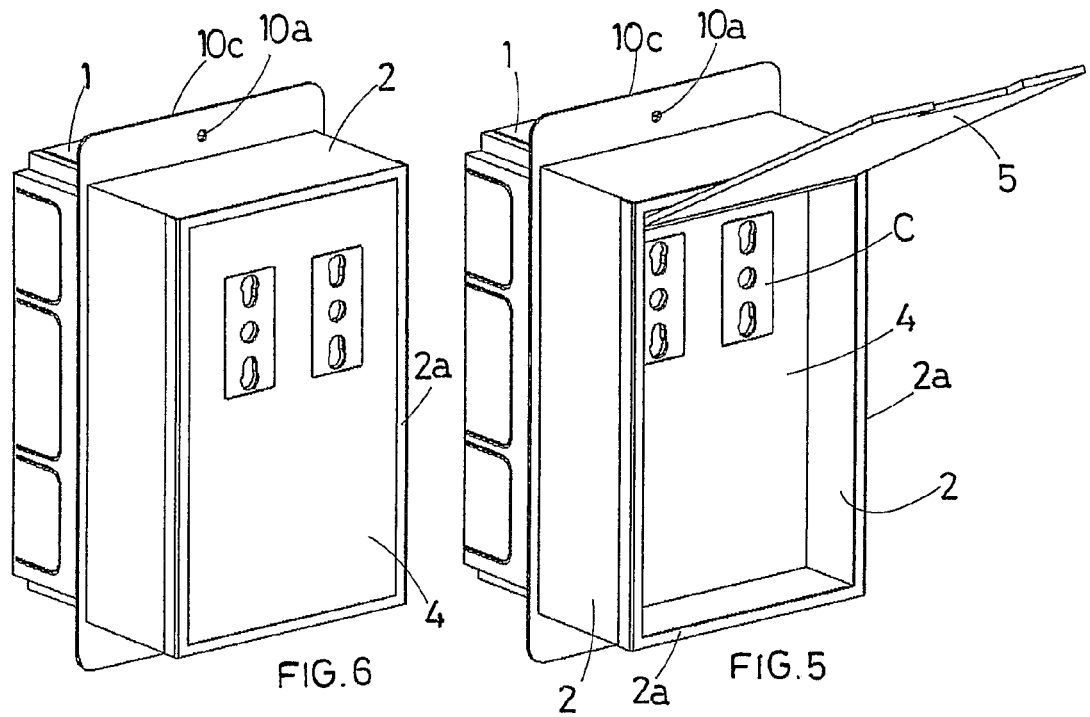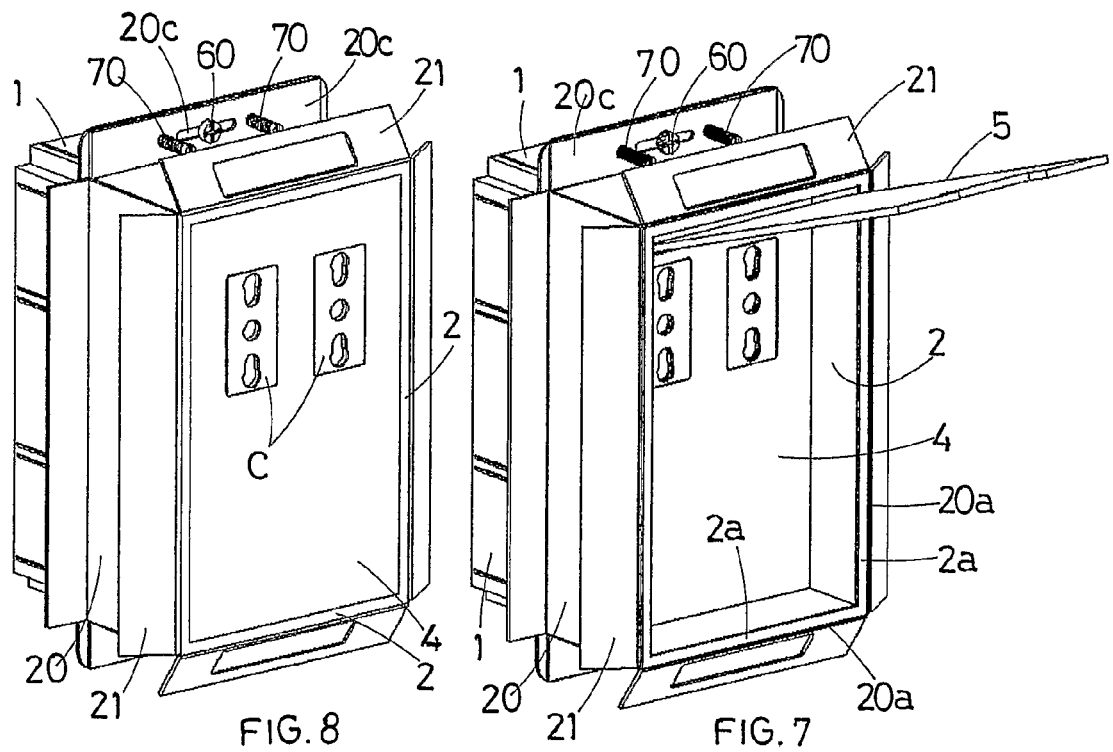

WALL FLUSH MOUNT SUPPORTING DEVICE FOR ELECTRIC OR ELECTRONIC COMPONENTS

BACKGROUND OF THE INVENTION

1. Field of the Invention

The present patent application refers to a wall flush mount supporting device for electric or electronic components, of the type commonly used in electric installations, such as, for example, control switches, electric sockets, thermostats, emergency lamps, etc.

2. Description of Related Art

The devices that are currently used to house and support the said components are characterised by standardized construction, according to which the components are supported by a plate (hereinafter defined as "component-holder plate") screwed into a wall-recessed box that receives the wires of the chased electric installation.

The said box is made of plastic material and is provided with suitably weakened circular areas that can be easily removed to pass the electric wires that must be wired to the terminal boards of said electric or electronic components, whose body is practically contained inside the protection box.

As mentioned earlier, the component-holder plate is screwed into the front opening of the box, after recessing it into the wall in such a way that the opening is basically coplanar to the wall.

In view of the above, the front of the electric or electronic components remains visible on the front of the component-holder plate in the proximity of suitable control means or electric sockets.

For aesthetical reasons the component-holder plate is covered and hidden by an external finishing plate with one or more windows that exactly house the control means or electric sockets.

Regardless of the multiple designs of the finishing plates and component-holder plates, it must be said that all the available models are characterised in that the front of the components and relevant framing plate protrude from the installation wall, thus interrupting the clean design of the wall with a projecting element that can be hardly camouflaged or hidden.

For this reason, supporting devices have drawn the designers' attention who attempted to find new external shapes that can make installation easier and more attractive and to reduce the visual impact on the architecture of the room or furniture.

US patent application publication No. US2003/0089710 A1 describes an electrical box into which a one-piece recessed faceplate is inserted, said faceplate allowing for the adjustment of the distances between the outward surface of the electrical instrumentality installed into the electrical box and the flange positioned at the front of said faceplate.

Said faceplate comprising a flange which is flush against the front wall and a rear wall connected to each other by means of an interior surface attached to and projecting forward to rear wall which is provided with aperture for the accommodation of said electrical instrumentality the outward surface of which is flush against said aperture.

The back side of said front flange is designed to seat against the mounting surface of box.

Said front flange can be provided with a sliding cover which covers and completely hides said front flange.

This means that also said cover protrudes from the mounting surface of box.

Furthermore the presence of cover increases the size of the faceplate portion protruding from the mounting surface of box.

BRIEF SUMMARY OF THE INVENTION

The aforementioned considerations have led to the design of a new supporting device for electric or electronic components characterised by clean aesthetics and by the possibility of being camouflaged and integrated into the continuous surface of the wall thanks to the fact that the front cover is perfectly flush with the wall.

The said front cover consists in the finishing plate, which is represented by a perfectly smooth plate with one or more windows that can exactly house the front walls of the electric or electronic elements.

According to an alternative embodiment of the invention, the front cover is represented by a lid made of a perfectly smooth plate that covers the back compartment with the finishing plate.

In any case, the possibility to mount the front cover of the supporting device flush with the wall favours the perfect integration of the device in the room, thus avoiding the typical accumulation of dust and dirt on it.

The device of the invention comprises a box-shaped collar that is frontally fixed to a traditional wall-recessed box, which acts as fastening element for the component-holder plate that is exactly housed inside the box.

The box-shaped collar is composed of four perpendicular walls, whose front edge acts as reference plane for wall scraping, meaning that the wall is plastered in such a way that its surface is perfectly flush with the front edge of the box-shaped collar.

None of the components of the device of the invention projects with respect to the plane where the four front edges of the box-shaped collar rest, thus perfectly housing the front finishing plate or front cover.

The box-shaped collar is also provided with means used to adjust its fastening position with respect to the box in order to ensure the perfect co-planarity of the collar front edges with the wall where the box is recessed.

The box-shaped collar is dimensioned in such a way that it can exactly house the component-holder plate, which is permanently fixed inside the box-shaped collar by means of screws that engage into suitable tubular threaded housings located on the internal side and on the bottom of the box-shaped collar.

The component-holder plate, provided with the relevant finishing plate, is therefore in backward position with respect to the wall and, if desired, it can be hidden by means of a collapsible lid located on the front opening of the box-shaped collar, thus being perfectly flush to the wall.

Alternatively, the component-holder plate, provided with the relevant finishing plate, can be moved forward and held flush with the front opening of the box-shaped collar by means of a spacing frame located between the plate and the other tubular threaded elements of the collar.

According to the fixing position of the component-holder box (i.e. forward or backward position), the front edges of the box-shaped collar act as a frame for the collapsible lid or for the covering finishing plate of the component-holder plate.

DESCRIPTION OF THE DRAWINGS

For major clarity the description of the device according to the present invention continues with reference to the enclosed drawings, which are intended for purposes of illustration only and not in a limiting sense, whereby:

FIG. 5 is a view of the device of FIG. 1 after assembly;

FIG. 6 is a view of the device of FIG. 2 after assembly;

FIG. 7 is a view of the device of FIG. 3 after assembly;

FIG. 8 is a view of the device of FIG. 4 after assembly.

DETAILED DESCRIPTION OF THE INVENTION

Figure 1:
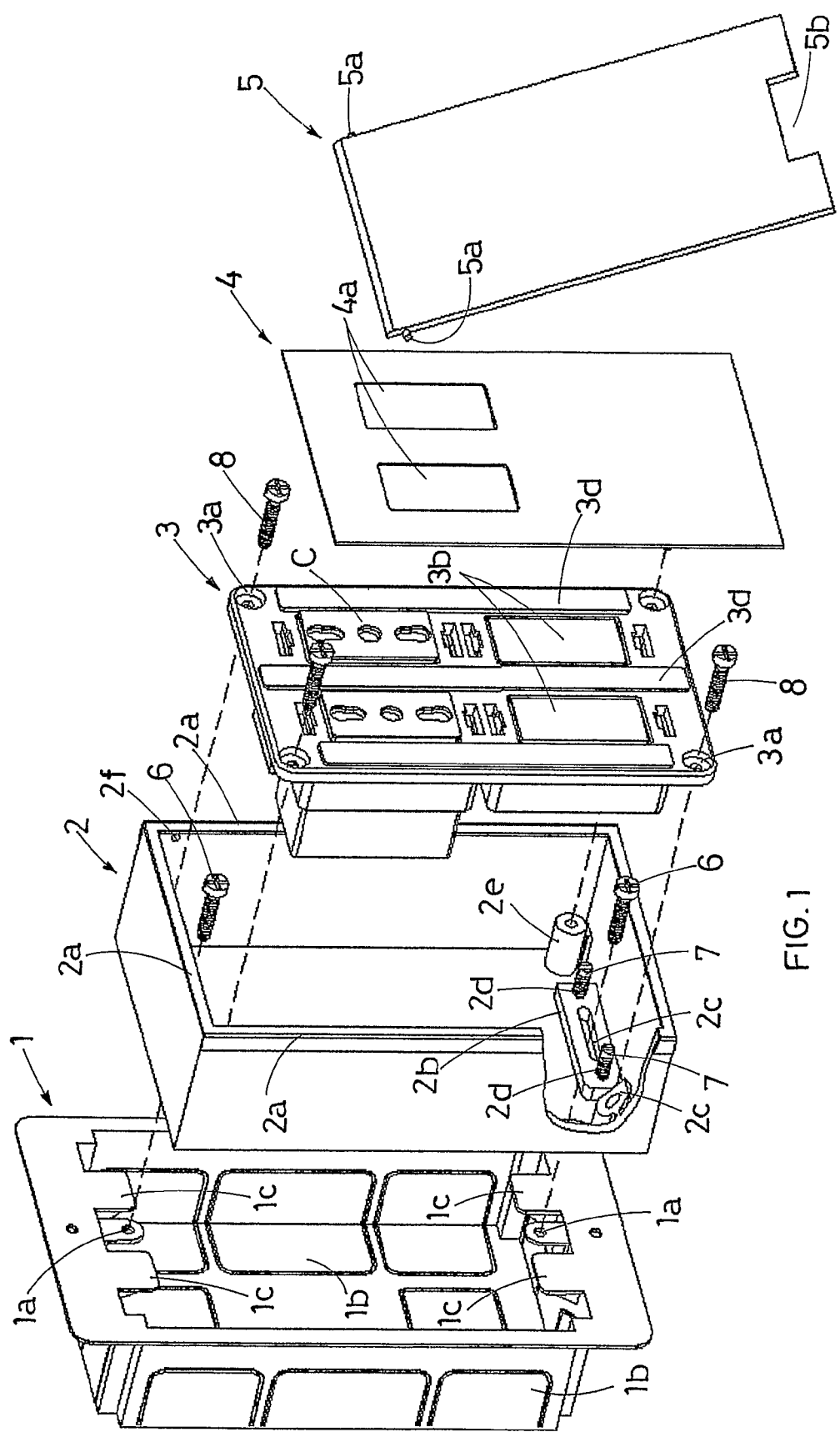
FIG. 1 is an exploded axonometric view of the device of the invention in the embodiment with wall flush front lid.

According to the preferred embodiment of the invention, shown in FIG. 1, the device of the invention comprises a box (1), a box-shaped collar (2), a component-holder plate (3), a finishing plate (4) and a front cover (5).

The bottom and the sides of the box (1) feature suitably weakened areas (1b) that can be removed to pass the electric wires used to power the electric or electronic components.

The box-shaped collar (2) is composed of four perpendicular walls with the same height and has a front opening bordered by the front edges (2a) of the walls and a back opening bordered by the back edges of the said walls.

The back opening features internal ears (2b) provided with a central slot (2c) to pass the screw (6) used to fix the collar (2) to the box (1), which is provided with suitably threaded holes (1a) adapted to receive the screws (6).

Two threaded holes (2d) are situated in lateral position with respect to the central slot (2c) used to engage two adjustment nuts (7) that allow for small adjustments of the fixing position of the box-shaped collar (2) with respect to the box (1), in order to give the box-shaped collar (2) a perfectly perpendicular position with the wall, even if the recessed fixing box (1) is not.

Tongues (1c) are located in the opening of the box, which engage with the back of the ears (2b) on the back opening of the collar (2) for the adjustment nuts (7).

The back opening of the box-shaped collar (2) has internal tubular threaded elements (2e) at the four corners, used to engage the fixing screws (8) of the component-holder plate (3).

The component-holder plate is in fact provided with holes (3a) aligned with the threaded tubular elements (2e) that receive the fixing screws (8).

The component-holder plate (3) is also provided with slots (3b) used to engage the electric or electronic components (C), whose front fact is arranged in a slightly protruding position with respect to the slots (3b), while the body of the components protrudes on the back of the plate (3).

More precisely, the internal face of all components: (C) protrudes from the slots (3b) for a distance equal to the plate (4), thus ensuring perfect co-planarity between the external face of the plate (4) and the components (C).

In the enclosed drawings the plate (3) acts as support for two electric sockets (C).

The plate (3) is dimensioned in such a way that it can be perfectly contained inside the box-shaped collar (2).

In the embodiment of the invention shown in the enclosed drawings, the plate (3) is provided with magnetic inserts (3d) adapted to engage the metal plate (4) with a perfectly planar smooth plate, having two windows (4a) that exactly house the sockets (C) in perfectly flush position with the external face of the plate (4).

The plate (4) is held in backward position with respect to the front opening of the box-shaped collar (2), whose front edges (2a) are used as reference point for wall scraping, its surface being perfectly flush with the edges (2a).

In view of the above, the finishing plate (4) rests on the bottom of a perfectly squared niche, whose opening coincides with the front opening of the box-shaped collar (2) and is perfectly flush to the wall.

If needed, the niche can be frontally closed with the cover (5) dimensioned in such a way to be perfectly contained and positioned inside the box-shaped collar (2) and, more precisely, inside the front opening of the collar (2), so that the external face of the cover (5) is perfectly flush with the four front edges (2a) of the collar.

The cover (5) is laterally provided with two coaxially opposite pins (5a) inserted in two holes (2f) in internal position on the vertical edges of the front opening of the box-shaped collar (2), it being apparent that the cover (5) can be opened by lifting it towards the outside by means of a notch (5a) in central position on the base of the cover (5).

Figure 2:
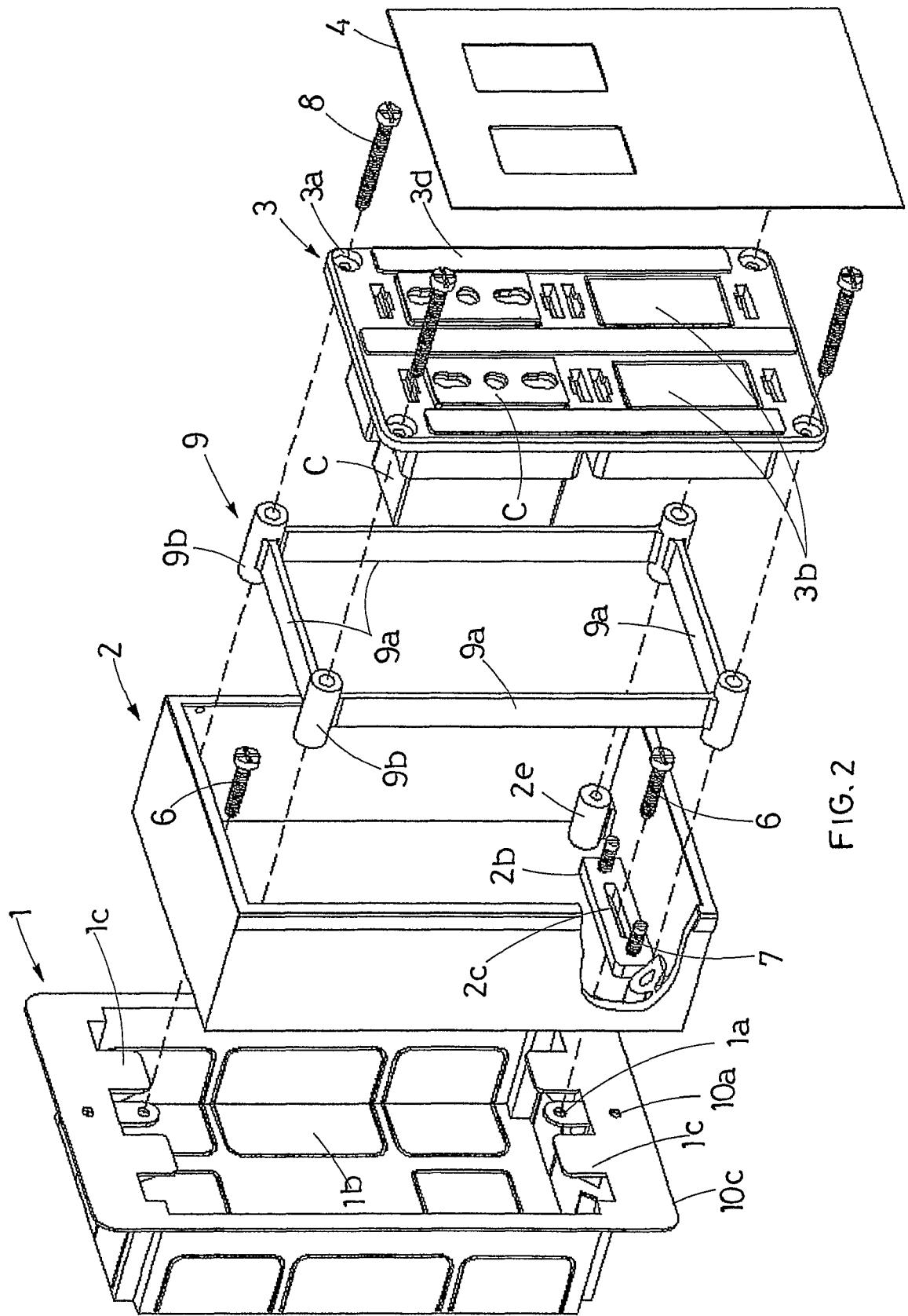
FIG. 2 is an exploded axonometric view of the device of the invention in the embodiment with spacing frame used to hold the finishing plate in wall-flush position.

FIG. 2 shows an alternative embodiment of the structure according to the invention, which only differs from the embodiment illustrated above in that it is not provided with the cover (5) and in that the plate (4) is assembled in forward position in the same location as the cover (5).

This embodiment comprises for a spacing frame (9) located between the component-holder plate (3) and the box-shaped collar (2) in order to ensure the forward position of the plate (4).

The spacing frame (9) is composed of four right edges (9a) and four tubular angular parts (9b) used to insert the screws (8) that engage with the threaded tubular elements (2e) of the box-shaped collar (2).

Figure 3:
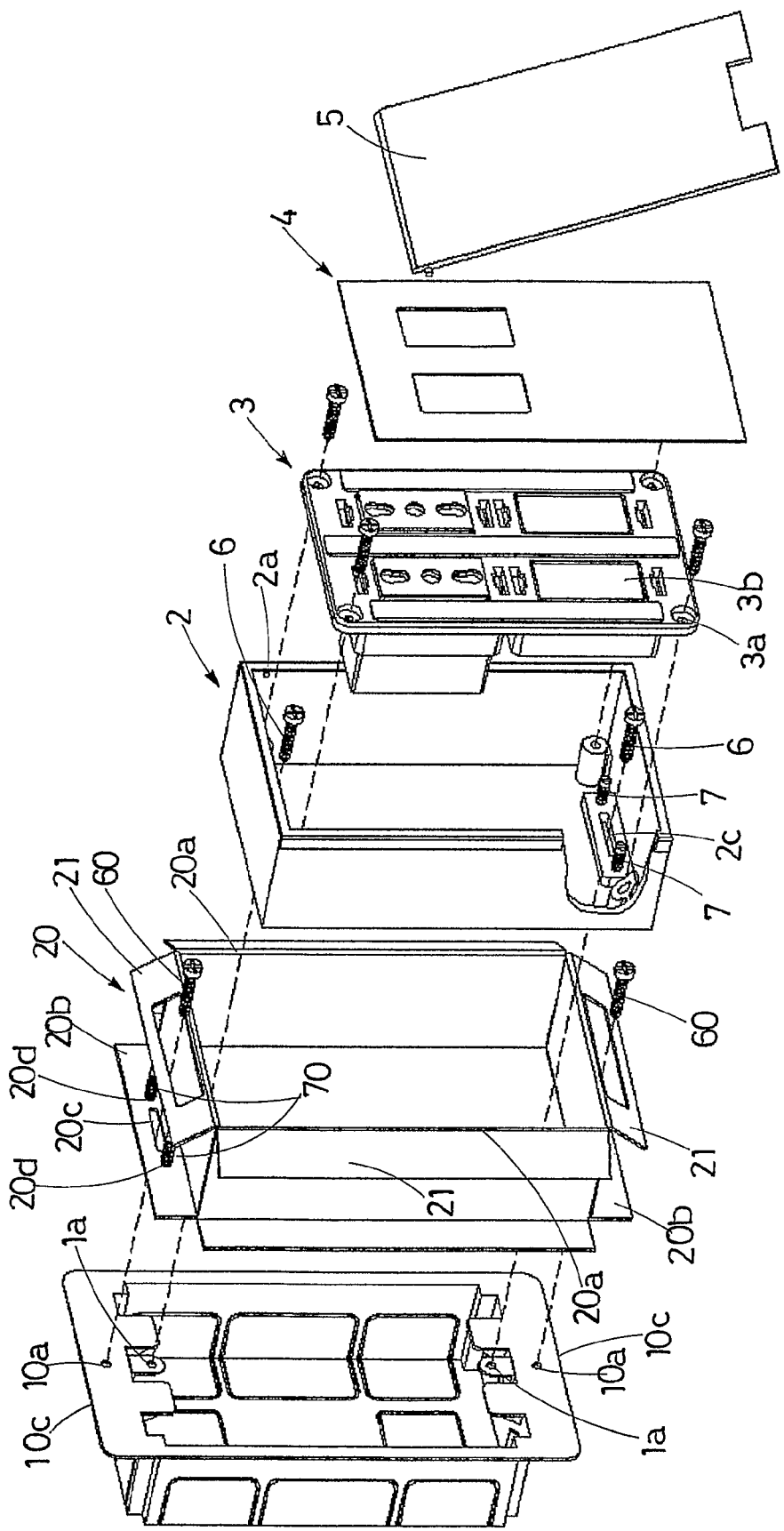
FIG. 3 is an exploded axonometric view of the device of the invention in another embodiment with a counter-collar used to house the aforementioned collar, with a front cover as shown in FIG. 1.
Figure 4:
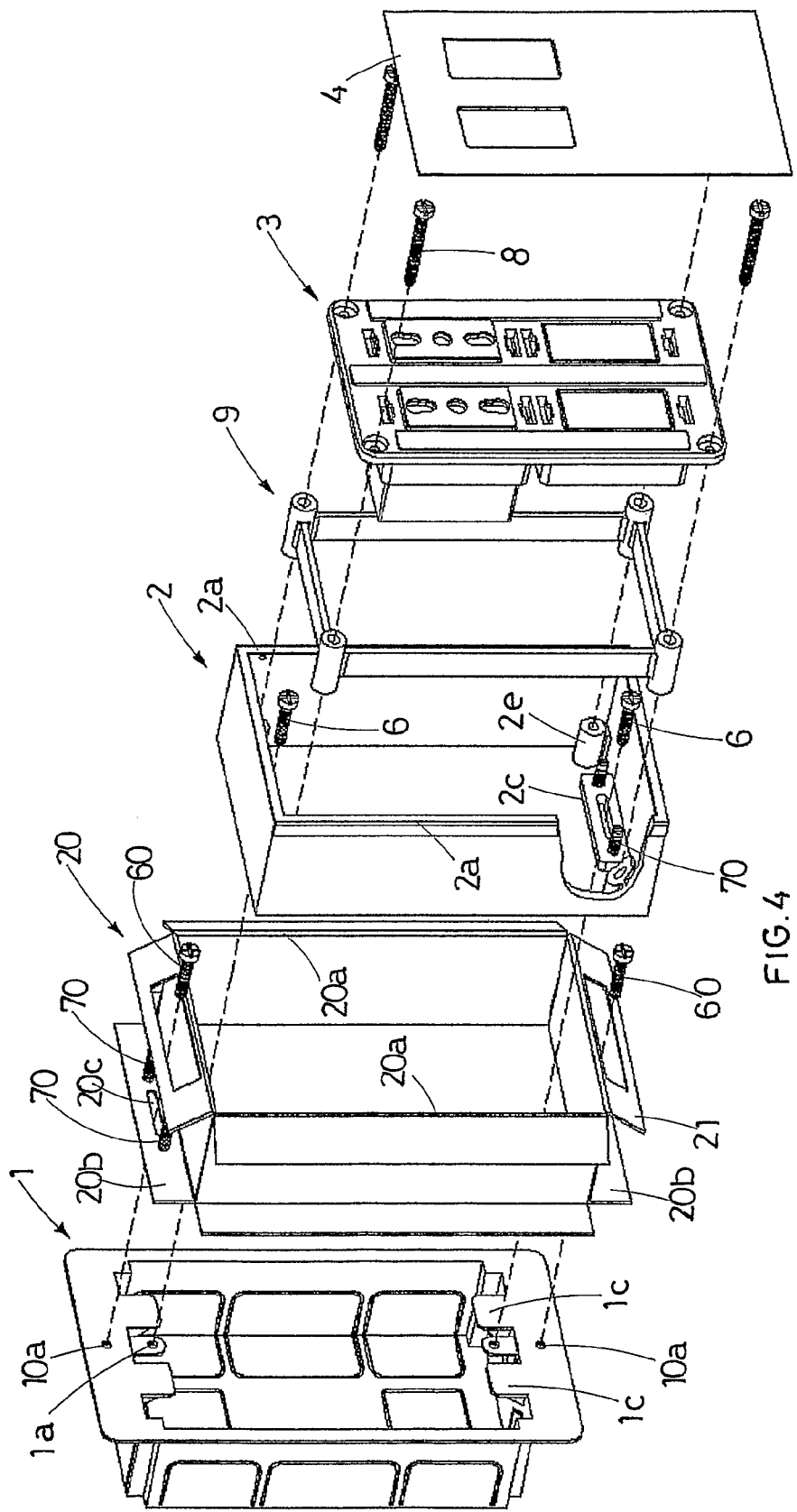
FIG. 4 is the same as FIG. 3, except for the fact that the device is provided with the spacing frame, and not with the front cover.

FIG. 3 shows the third and last embodiment of the structure according to the invention, which differs from the afore-illustrated embodiments in that it comprises a counter-collar (20) dimensioned in such a way that it can exactly house the collar (2), whose front edges (2a) are flush with the edges (20a) of the counter-collar (20) made of box-shaped sheet with four perpendicular walls with the same height.

The back opening of the counter-collar (20) features external ears (20b) provided with a central slot (20c) to pass the screw (60) used to fix the counter-collar (20) to the box (1), which has suitably threaded holes (10a) adapted to receive the screws (60).

Two threaded holes (20d) are situated in lateral position with respect to the central slot (20c) used to engage two adjustment nuts (70) that allow small adjustments of the fixing position of the counter-collar (20) with respect to the box (1) in order to give the counter-collar (20) a perfectly perpendicular position with the wall, even if the recessed fixing box (1) is not.

External tongues (10c) are located in the opening of the box (1), which engage with the back of the ears (20b) situated on the back opening of the counter-collar (20) for the adjustment nuts (70).

The threaded holes (10a) are located in external position with respect to the opening of the box (1), which has the internal threaded holes (1a) for the screws (6) used to fix the collar (2).

The third embodiment of the invention has been designed being aware that the front edges (2a) of the collar (2) can easily suffer scratches or surface abrasions during wall scraping, when the edges act as reference for the wall scraping plane.

In order to minimize this type of inconvenience, the collar (2) used in the first two embodiments of the invention should be preferably made of aluminum or steel, resulting in considerable production costs.

Conversely, the collar (2) used in the third embodiment of the invention is very cost effective, being a plastic moulded part, since the wall will be scraped using the front edges (20a) of the counter-collar (20) as reference, with the counter-collar having a very low cost because of box-shaped sheet construction.

As illustrated in the enclosed drawings, the front edges (20a) coincide with the folding line of an external wing (21) made of the same sheet as the counter-collar (20).

In other words, the counter-collar (20) is fixed to the opening of the box (1), and the wall plastered in order to recess the counter-collar (20) completely, whose edges (20a) can be used as reference for wall scraping to obtain a perfectly flush wall with the edges (20a).

When the masonry works are completed, the collar (2) is exactly engaged inside the counter-collar (20) and fixed with the screws (6) to the box (1) behind the counter-collar (20).

Then the plate (3) is inserted inside the collar (2) and fixed with the screws (8), with the optional frame (9), as shown in FIGS. 3 and 4 and FIGS. 7 and 8, respectively.

The invention claimed is:

1. Wall flush mount supporting device for electric or electronic components, of the type comprising a wall recessed box, a box-shaped collar, a component-holder plate and a finishing plate frontally applied on the component-holder plate, characterized in that said box-shaped collar is adapted to contain and support said plate with the respective finishing plate so that the external surface of said finishing plate and the external surface of said components do not protrude from the frontal edges of the collar, having a linear and smooth profile, so as to be used—when the device is installed—as reference point for wall scraping, the external surface of the finishing plate being perfectly flush with the front edges; it being provided that said box-shaped collar adopts means used to fix said collar to the recessed box and means used to fix said plate inside the box-shaped collar.

2. Wall flush mount supporting device for electric or electronic components ad defined in claim 1, characterized in that the box-shaped collar is provided with means used to adjust its fixing position to the box.

3. Wall flush mount supporting device for electric or electronic components as defined in claim 2, characterized in that the means used to fix the box-shaped collar to the box comprise at least an opposite pair of ears in internal position on the back opening of the collar and provided with central slots used to insert relevant screws, each of them being engaged with a threaded hole internally provided in the opening of the box.

4. Wall flush mount supporting device for electric or electronic components as defined in claim 3, characterized in that the adjustment means consist in a pair of adjustment nuts engaged into a pair of threaded holes astride the central slot with tongues on the internal opening of the box behind the ears.

5. Wall flush mount supporting device for electric or electronic components as defined in claim 1, characterized in that the component-holder plate is provided with magnetic inserts used to engage the finishing plate, with windows adapted to exactly house the said components, whose body remains behind the plate, and the front edge projects externally from the slots of the plate flush with the finishing plate.

6. Wall flush mount supporting device for electric or electronic components as defined in claim 1, characterized in that the means used to fix the box-shaped collar to the component-holder plate consist in screws, inserted into suitable holes on the plate engaged in tubular threaded elements in internal position on the back opening of the box-shaped collar.

7. Wall flush mount supporting device for electric or electronic components as defined in claim 1, characterized in that the box-shaped collar is frontally closed with a cover dimensioned in such a way to be perfectly contained and positioned inside the front opening of the box-shaped collar (2) flush with the front edges.

8. Device as defined in claim 7, characterized in that the cover is provided with two coaxially opposite pins in lateral position adapted to be inserted into two holes on the vertical sides of the front opening of the box-shaped collar.

9. Wall flush mount supporting device for electric or electronic components as defined in claim 1, characterized in that it comprises a spacing frame located between the box-shaped collar and the plate and suitable to be contained inside the collar in order to hold the plate with relevant finishing plate perfectly flush with the front opening of the collar.

10. Wall flush mount supporting device for electric or electronic components as defined in claim 9, characterized in that the spacing frame is composed of four perpendicular edges and four tubular angular parts used to insert the screws that fix the plate and engage with the tubular threaded elements of the box-shaped collar.

11. Wall flush mount supporting device for electric or electronic components as defined in claim 1, characterized in that it comprises a counter-collar of box-shaped sheet formed of four perpendicular walls with the same height, dimensioned in such a way that it can exactly house the collar, whose front edges are flush with the edges of the counter-collar, having at least an opposite pair of external ears in the back opening, each of them being provided with a central slot to pass a screw used to fix the counter-collar to the box, which has suitable threaded holes adapted to receive the screws.

12. Wall flush mount supporting device for electric or electronic components as defined in claim 11, characterized in that the counter-collar has two threaded holes in lateral position with respect the central slot used to engage two adjustment nuts held by suitable tongues situated on the external opening of the box.

13. Wall flush mount supporting device for electric or electronic components as defined in claim 11, characterized in that the front edges of the counter-collar coincide with the folding line of an external wing made of sheet.

* * * * *